Sept. 27, 1938.　　　H. E. NAISULER　　　2,131,115
FRAMEWORK CONSTRUCTION
Filed Aug. 7, 1935
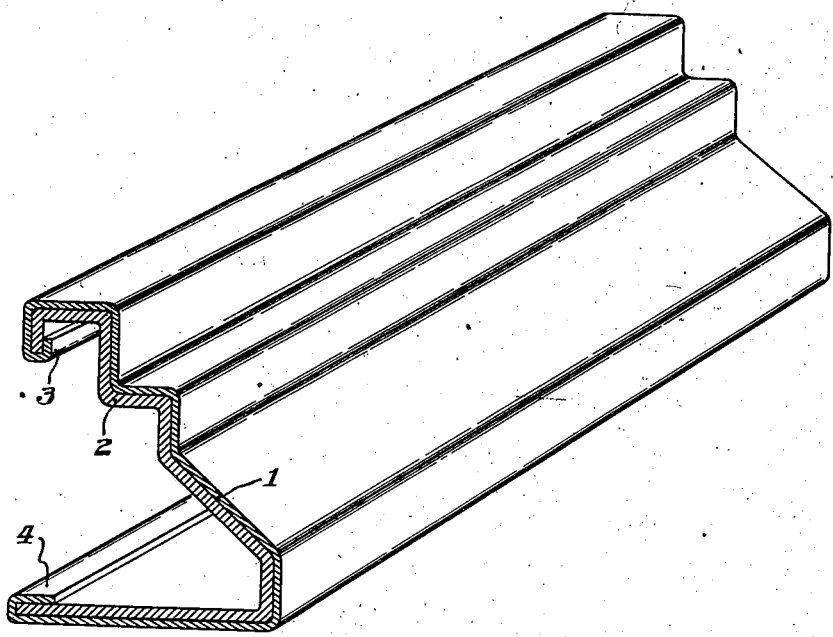
INVENTOR
Harry E. Naisuler
BY
ATTORNEY Patented Sept. 27, 1938

2,131,115

UNITED STATES PATENT OFFICE 2,131,115

FRAMEWORK CONSTRUCTION

Harry E. Naisuler, Whitman, Mass.

Application August 7, 1935, Serial No. 35,192

6 Claims. (Cl. 29—181)

This invention relates to framework construction, and more particularly to a laminated structural framework for windows in store fronts, show cases, skylights, greenhouses, conservatories, studios, glass doors and transoms, glass partitions, and, in fact, any similar constructions employing plate glass requiring a supporting framework.

It has been common practice, in constructions of this sort, and particularly in store front constructions, to make the glass supporting frameworks in laminated form. Within the past few years, there have come into rather extensive use frameworks of this type in which the outer shells are made of stainless steels, since these steels take and retain a high luster when once burnished. With certain burnishing methods employed, however, a considerable amount of heat is developed and, since stainless steels have a relatively low heat conductivity, the shells are in constant danger of being discolored and of becoming buckled by the accumulated heat in burnishing. To overcome this difficulty, it has been proposed to make the inner or core members of the constructions out of aluminum or an alloy high in aluminum, inasmuch as these metals have a high heat conductivity and relatively rapidly dissipate the heat developed in the burnishing process. However, a stainless steel covered aluminum construction is subject to the serious disadvantage, among several, of being so comparatively soft that it can easily be bent or dented during shipment and during installation unless considerable care is exercised.

It has also been proposed to form the laminated construction by simultaneously shaping both the stainless steel shell and the aluminum core member while holding them in contacting relation, pressing the overlapping edges of the shell around over the core, and then burnishing the shell. The heat developed during burnishing, however, causes uneven expansion of the two laminated members, since aluminum has a much higher coefficient of expansion than stainless steel. Thus, if the two laminations fit each other snugly when cool, the greater expansion of the aluminum core caused by the heat of burnishing produces buckling or warping of the aluminum and, since aluminum is not a resilient metal, it will not return to its original shape but will remain warped. On the other hand, if the two laminations are made to fit snugly when heated, then, upon cooling, the aluminum core draws away somewhat from the stainless steel shell by reason of its relatively greater contraction. This not only further leaves the relatively thin shell subject to easily being dented or otherwise marred, but permits the parts to rattle somewhat when installed and endangers the safety of the construction.

The primary object of my invention is to provide an improved laminated framework for store front and analogous constructions which will be free from the disadvantages characteristic of prior art constructions.

More specifically, it is an object of my invention to provide an improved laminated window framework of the type set forth which may be burnished according to standard and accepted burnishing methods and which will not suffer any deleterious effects thereby.

Another object of my invention is to provide, in a laminated window framework for storefront constructions having a stainless steel shell, an improved core or backing member which is particularly suitable to use with the stainless steel shell.

A further object of my invention is to provide an improved laminated window frame construction which is exceptionally strong and durable, which can be shipped and handled with only the usual care observed by workers without danger of being deformed, which readily lends itself to facile and rapid quantity production, which is economical of manufacture, and which is highly efficient in use.

In accordance with my invention, I provide a backing member or core of a resilient material having substantially the same coefficient of expansion as the shell or casing member. Preferably, the backing member is formed of steel of suitable thickness and is covered with a layer of non-corrosive metal. Since both the shell and the backing member undergo a like amount of expansion upon being heated, there is no danger of either becoming warped or distorted. By suitably burnishing the shell, the danger of discoloring or otherwise marring it as a result of the heat is eliminated, and consequently members having substantially the same thermal conductivity may be employed. At the same time, a construction which is strong and durable is provided and therefore no exceptional care need be exercised in the handling thereof.

The novel features that I consider characteristic of my invention are set forth with particularity in the appended claims. The invention itself, however, together with additional objects and advantages thereof, will best be understood from the following description of several specific embodiments thereof when taken in connection with the accompanying drawing in which the single figure is a perspective view of a section of a framework constructed in accordance with my invention.

Referring more specifically to the drawing, there is shown an outer frame member of the type used in store front constructions, for example, and comprising an outer shell or casing member 1 and an inner core or backing member 2. The members 1 and 2 may be pressed or rolled to the desired shape either simultaneously, with the marginal edges 3 and 4 of the casing member 1 folded over snugly around the marginal edges of the backing member 2, or they may be formed separately and the core 2 thereafter slid into the shell 1, the former method being preferred, however. In any event, the two members should be made to fit each other snugly.

The casing member 1 may be made of any suitable sheet material, such as copper, brass, bronze, steel, or any other desired material. Where stainless steel is used, that known commercially as "18-8" is preferred, although any other stainless steel composition may be used. The backing member 2, which is considerably thicker than the shell member, may be made of copper, bronze or a ferrous material which is coated with a layer of non-corrosive metal. I prefer a fairly resilient low carbon, basic, open hearth steel which includes the following materials:

Carbon _____approximately 0.09 to 0.12
Manganese _____do__ 0.03 to 0.50
Sulphur and phosphorus_____under 0.04 as I have found such steel to be exceptionally strong and durable. The steel may be coated with such non-corrosive metals as cadmium or zinc, either by hot dipping, spraying or electrodeposition, as desired, although hot dipping is preferred as being fastest and most economical.

The members 1 and 2 should have substantially the same coefficients of expansion so that they will respond substantially equally to the action of heat. It is possible to burnish the stainless steel casing member without developing enough heat to produce discoloration thereof, as by burnishing in a forced draft of cold air, in which case the specific thermal conductivities of the materials used for the casing and backing members would be entirely immaterial. It is, however, essential that their coefficients of expansion be as nearly the same as possible so that, even under extreme conditions, no separation or warping of the two members will take place. This is further assured when the two members are made of resilient materials.

From the foregoing description, it will be apparent that I have provided a strong, durable construction embodying a stainless steel sheathed framework, and while I have described several specific embodiments thereof, it will, no doubt, be apparent to those skilled in the art that many modifications thereof are possible. I desire, therefore, that my invention shall not be limited except insofar as is necessitated by the prior art and by the spirit of the appended claims.

I claim as my invention:

1. A laminated framework construction comprising a core of cadmium coated steel and a shell of stainless steel over said core, said core and shell each having substantially the same coefficient of expansion, and said shell being burnished.

2. A laminated framework construction comprising a core of cadmium coated steel and a shell of stainless steel over said core, said core and shell each having substantially the same coefficient of expansion and each being resilient, and said shell being burnished.

3. A laminated framework construction comprising a core of cadmium coated steel and a shell of stainless steel over said core, said core and shell each having substantially the same coefficient of expansion and said core including carbon approximately 0.09 to 0.12, manganese approximately 0.03 to 0.50, and sulphur and phosporus combined less than 0.04.

4. The invention set forth in claim 3 wherein the stainless steel shell is burnished.

5. The invention set forth in claim 3 characterized in that the core and shell are both shaped and fit each other snugly.

6. The invention set forth in claim 3 characterized in that the core and shell are both shaped and fit each other snugly, and characterized further in that said shell is burnished.

HARRY E. NAISULER.